(12) United States Patent
Fontana et al.

(10) Patent No.: US 9,370,733 B2
(45) Date of Patent: Jun. 21, 2016

(54) PROCESS FOR THE PURIFICATION OF (PER) FLUOROPOLYETHERS WITH CARBOXYLATE END GROUPS

(71) Applicant: SOLVAY SPECIALTY POLYMERS ITALY S.P.A., Bollate, MI (US)

(72) Inventors: Simonetta Antonella Fontana, Milan (IT); Pier Antonio Guarda, Arese (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 14/440,821

(22) PCT Filed: Oct. 30, 2013

(86) PCT No.: PCT/EP2013/072679
§ 371 (c)(1),
(2) Date: May 5, 2015

(87) PCT Pub. No.: WO2014/067981
PCT Pub. Date: May 8, 2014

(65) Prior Publication Data
US 2015/0251107 A1    Sep. 10, 2015

(30) Foreign Application Priority Data
Nov. 5, 2012 (EP) .................................... 12191288

(51) Int. Cl.
| C07C 51/42 | (2006.01) |
| B01D 15/42 | (2006.01) |
| B01D 15/08 | (2006.01) |
| C08G 65/00 | (2006.01) |
| C08G 65/30 | (2006.01) |

(52) U.S. Cl.
CPC .............. B01D 15/424 (2013.01); B01D 15/08 (2013.01); C08G 65/007 (2013.01); C08G 65/30 (2013.01); C08G 2650/48 (2013.01)

(58) Field of Classification Search
CPC .... B01D 15/08; B01D 15/424; C08G 65/007; C08G 65/30
See application file for complete search history.

(56) References Cited

U.S. PATENT DOCUMENTS

| 3,442,942 | A | 5/1969 | Sianesi et al. |
| 4,755,330 | A | 7/1988 | Viola et al. |
| 5,246,588 | A | 9/1993 | Tonelli et al. |
| 5,258,110 | A | 11/1993 | Sianesi et al. |
| 5,262,057 | A | 11/1993 | Tonelli et al. |
| 5,777,291 | A | 7/1998 | Marchionni et al. |
| 5,910,614 | A * | 6/1999 | Turri ..................... C08G 65/30 210/656 |
| 6,127,498 | A | 10/2000 | Tonelli et al. |
| 7,288,682 | B2 | 10/2007 | Tchistiakov et al. |
| 8,008,523 | B2 | 8/2011 | Marchionni et al. |

FOREIGN PATENT DOCUMENTS

| EP | 2436716 | * | 4/2012 |
| EP | 2436716 | A1 | 4/2012 |
| GB | 1104482 | A | 2/1968 |
| WO | 2007113293 | A1 | 10/2007 |
| WO | WO2007113293 | * | 10/2007 |

OTHER PUBLICATIONS

Novec7200.*
Novec7500.*
Wojcik L. et al., "Separation and determination of perfluorinated carboxylic acids using capillary zone electrophoresis with indirect photometric detection", Journal of Chromatography, Sep. 22, 2006, vol. 1128, No. 1-2, pp. 290-297, XP024967618, ISSN: 0021-9673, DOI: 10.1016/J.CHROMA.2006.06.049 [retrieved on Sep. 22, 2006]-Elsevier Science Publishers B.V, NL.
De Voogt P. et al., "Analytical chemistry of perfluoroalkylated substances", TRAC, Trends in Analytical Chemistry, Apr. 1, 2006, vol. 25, No. 4, pp. 326-342, XP027892016, ISSN: 0165-9936 [retrieved on Apr. 1, 2006]-Elsevier, Amsterdam, NL.

* cited by examiner

*Primary Examiner* — Yevegeny Valenrod
*Assistant Examiner* — Blaine G Doletski

(57) ABSTRACT

The invention relates to a batch chromatography process the purification of (per)fluoropolyether (PFPE) carboxylates, in particular to a process for increasing the average functionality of PFPE carboxylates mixtures.

17 Claims, No Drawings

PROCESS FOR THE PURIFICATION OF (PER) FLUOROPOLYETHERS WITH CARBOXYLATE END GROUPS

This application is a U.S. national stage entry under 35 U.S.C. §371 of International Application No. PCT/EP2013/072679 filed Oct. 30, 2013, which claims priority to European application No. 12191288.5 filed on Nov. 5, 2012. The entire contents of these applications are explicitly incorporated herein by this reference.

TECHNICAL FIELD

The present invention relates to a process for the purification of (per)fluoropolyethers (PFPEs) having carboxylate end groups, in particular to a process for increasing the average functionality of PFPE carboxylate mixtures.

BACKGROUND ART (Per)fluoropolyethers having carboxylate end groups (otherwise referred to as carboxylic PFPEs or PFPE carboxylates), in particular monofunctional carboxylic PFPEs, are generally used as surfactants, for the treatment of surfaces or as precursors of PFPEs having other end groups, for example as precursors of amides, esters or alcohols, which in turn can be converted into further derivatives, e.g. acrylate derivatives. For this purpose, it is desirable to use as starting materials as pure as possible carboxylic PFPEs. For example, in the preparation of acrylate derivatives the presence of PFPEs with non-functional (or neutral) end groups might impair the optical properties of the final product. However, certain manufacturing processes for PFPE carboxylates may lead to mono- and/or bifunctional PFPE carboxylates in admixture with non-functional PFPEs and it is therefore necessary to carry out a separation process (otherwise referred to as purification or enrichment process) in order to obtain the PFPE carboxylate with high purity.

Chromatographic techniques for the obtainment of highly pure mono- and bi-functional PFPEs having hydroxy or amino end groups from starting mixtures containing non-functional PFPEs are disclosed, for example, in U.S. Pat. No. 5,262,057 (AUSIMONT S.P.A.), U.S. Pat. No. 5,246,588 (AUSIMONT S.P.A.), U.S. Pat. No. 5,910,614 (AUSIMONT SPA) and U.S. Pat. No. 7,288,682 (SOLVAY SOLEXIS SPA).

In greater detail, U.S. Pat. No. 5,246,588 discloses a process for separating, or enriching, non-functional, monofunctional and bifunctional species in a mixture of PFPEs of the general formula:

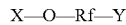

wherein:
Rf=straight or branched perfluoropolyoxyalkylene chain and Z and Y, which can be the same or different from one another, are non-functional groups or functional groups containing —OH, in particular —CF$_2$CH$_2$O(CH$_2$CH$_2$O)$_s$H and —CF$_2$CF$_2$CH$_2$O(CH$_2$CH$_2$O)$_s$H groups wherein s ranges from 0 to 2 (see abstract and col. 1, lines 8-37).

The separation process consists in subjecting the mixture of PFPEs to column chromatography using, as eluents, non-polar fluorinated solvents, either alone or in admixture with polar solvents.

In the examples, the purified mixtures have a functionality of from about 0.8 to about 1.2 and wherein chain R$_f$ has a number average molecular weight (Mn) ranging from about 600 to about 750.

U.S. Pat. No. 5,262,057 discloses a process for separating from one another non-functional, monofunctional and bifunctional species in a mixture of PFPEs of general formula:

X—O—Rf—Y wherein:
R$_f$=a perfluoropolyoxyalkylene chain comprising monomeric units of formulas (CF$_2$O), (CF$_2$CF$_2$O), (CF$_2$CF$_2$CF$_2$O) and having an average molecular weight ranging from about 500 to about 10,000
and
X and Y, equal to or different from one another, are non-functional end groups or functional end groups selected from CF$_2$CH$_2$O(CH$_2$CH$_2$O)$_s$H, —CF$_2$CF$_2$CH$_2$O(CH$_2$CH$_2$O)$_s$H and —CF$_2$CH$_2$NH$_2$, wherein s ranges from 0 to 2 (see col. 1, lines 8-32).

The separation process consists in subjecting the mixture of PFPEs to column chromatography under specific conditions, involving in particular the elution with non polar fluorinated solvents and polar solvents.

U.S. Pat. No. 5,910,614 discloses a process for separating bifunctional PFPEs having hydroxylic terminations from non-functional and monofunctional PFPEs having hydroxylic terminations contained in a mixture of perfluoropolyethers of formula (I):

where:
Rf is a perfluoropolyoxyalkylene chain having number average molecular weight (Mn) 500-10,000 and wherein the hydroxylic termination is of the type —CFX—CH$_2$OH, with X=F or CF3 (col. 1, lines 4-29).

The process comprises:
adding mixture (I) to a suspension of stationary phase in polar solvents in admixture with low polarity fluorinated solvents, at a defined volume/weight ratio of mixture (I)/stationary phase;
evaporating the solvent until a loose, dry powder is obtained;
a first extraction with low polarity fluorinated solvents;
a second extraction with polar hydrogenated solvents (col. 2, lines 32-52).

The process can be carried out either continuously or discontinuously (col. 2, lines 23-24).

U.S. Pat. No. 7,288,682 relates to a process for the separation of bifunctional PFPEs having —CH$_2$OH terminations from their mixtures with —CH$_2$OH monofunctional PFPEs; this process comprises at least two adsorption steps of a perfluoropolyether mixture of formula:

where:
R$_f$ is a perfluoropolyoxyalkylene chain having number average molecular weight 500-10,000 and wherein the hydroxylic termination is of the type —CFX—CH$_2$OH, with X=F or CF3;
to an adsorbing solid phase contained in a reactor equipped with stirring and filtration, with separation of a solid phase containing absorbed a PFPE mixture enriched in bifunctional PFPEs from a liquid containing a PFPE mixture having diminished bifunctional species. Thereafter, the solid phase is added with a polar solvent and stirred for a definite time range, then filtration is carried out to separate a liquid phase containing the PFPE having the desired high functionality (col. 1, line 34 to col. 4, line 32).

None of the above patents teaches or suggests that the methods therein disclosed are suitable for purifying mixtures of PFPE carboxylic acids.

A process for preparing highly pure monocarboxylic PFPEs is disclosed in U.S. Pat. No. 8,008,523 (SOLVAY SOLEXIS S.P.A); the process starts from a PFPE mixture of formula:

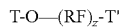

wherein RF is a PFPE chain having molecular weight or number average molecular weight in the range of 180-8,000; z is 0 or 1;
and T and T', equal to or different from one another, are selected from the functional end groups —$CF_2COF$, —$CF(CF_3)COF$, —$CF_2CF_2COF$, —$CF_2CF_2CF_2COF$, —$CF_2C(O)CF_3$, —COF, and the non functional (neutral) end groups —$CF_3$, —$CF_2CF_3$, —$C_3F_7$, —$C_4F_9$, wherein fluorine atoms can be substituted by a certain amount of chlorine atoms.

This mixture is subjected to a first distillation step to obtain a fraction wherein the molecular weight delta (i.e. the difference between the minimum and maximum molecular weight of the components) is lower than 600, partial fluorination of this fraction, esterification and/or hydrolysis of the fluorinated fraction and distillation. At col. 11, lines 21-25, is stated that " . . . the obtainment by distillation . . . of fractions having a molecular weight delta lower than 600 and the subsequent fluorination of the carbonyl end groups is essential for the obtainment of high purity monofunctional carboxylic compounds." Furthermore, U.S. Pat. No. 8,008,523 actually teaches that chromatography on a solid support is in fact not suitable for obtaining highly pure PFPE carboxylates. Comparative example 5 of this patent shows that column chromatography of a monocarboxylic PFPE having a molecular weight lower than about 600 on silica gel, using the procedure of the aforementioned U.S. Pat. No. 5,246,588, U.S. Pat. No. 5,262,057 and U.S. Pat. No. 5,910,614 and a mixture of fluorinated solvents (for instance hexafluoroxylene and perfluoroheptane) and polar solvents (for instance alcohols, acetone, ethyl acetate), as suggested by U.S. Pat. No. 5,910,614, does not allow to recover or separate mono- and bicarboxylic PFPEs, because they remain adsorbed on the column silica gel.

However, the above process is difficult and time-consuming, since it needs several steps; furthermore, it can be applied only to PFPEs having narrow molecular weight distributions (delta MW<600); thus, the need is still felt to provide a convenient method for purifying polydispersed PFPE carboxylates from mixtures of non-functional and functional PFPE carboxylates.

EP 2436716 A discloses a process for the separation of mixtures of non-functional PFPEs, mono- and bi-functional PFPE carboxylates. The process comprises subjecting the mixture to absorption treatment on an acid adsorbent which is dispersed in a fluorinated solvent. The adsorbent is then washed with a mixture of a fluorinated solvent and a strong acid in order to remove from the adsorbent the mono-PFPE carboxylate. This process is said to allow reducing the content of bi-functional PFPE carboxylates to a range of 0.1-10% mol with respect to the total moles of mono- and bi-functional PFPE carboxylates.

WOJCIK, L., et al. Separation and determination of perfluorinated carboxylic acids using capillary zone electrophoresis with indirect ohotometric detection. *Journal of Chromatography*. 2006, vol. 1128, no. 1-2, p. 290-297. discloses a method of separation of perfluorocarboxylic acids by capillary zone electrophoresis. No disclosure or suggestion is made to the separation of PFPEs, nor to batch chromatography processes.

VOOGT, P D, et al. Analytical chemistry of perfuoroalkylated substances. *Trends in analytical chemistry*. 2006, vol. 25, no. 4, p. 326-342. deals with the analytical chemistry of perfluoroalkylated substances; PFPEs are not specifically mentioned or suggested. Moreover, it appears from FIG. 1 that the sole separation technique therein mentioned is liquid chromatography.

SUMMARY OF INVENTION

It has now surprisingly been found that polydispersed (per)fluoropolyethers (PFPEs) carboxylates having high average functionality and high number average molecular weight ($M_n$) can be conveniently obtained by means of batch chromatography from PFPE carboxylates having lower average functionality.

The process of the present invention comprises, preferably consists of, the following steps:
a) contacting a mixture (M) of non-functional PFPEs and functional PFPEs carboxylates with high number average molecular weight, said mixture (M) having functionality (F), with a solid phase and a fluorinated organic solvent at ambient conditions to obtain a suspension (S) of a solid phase having adsorbed onto it a mixture (M1) of functional PFPE carboxylates with functionality (F1) higher than (F) and a liquid phase having therein dissolved a mixture (M2) with functionality (F2) lower than (F);
b) separating the liquid phase from the solid phase;
c) optionally carrying out one or more washings of the solid phase with the same fluorinated solvent as used in step a);
d) adding the solid phase with a mixture of an alcohol and a fluorinated organic solvent to obtain a suspension (S2) of the solid phase in a liquid phase, said liquid phase having mixture (M1) therein dissolved;
e) separating the liquid phase from the stationary phase.

Preferably step d) is carried out adding the solid phase with a mixture of an alcohol and a fluorinated organic solvent to obtain a suspension (S1) and heating to obtain a suspension (S2) of the solid phase in a liquid phase, said liquid phase having mixture (M1) therein dissolved.

For the sake of clarity, the following definitions apply throughout the present description:
the expressions "carboxylic PFPE", "PFPE carboxylate" and "functional PFPE having (or containing) carboxylic acid end groups" denote a fluoropolymer containing a fully or partially fluorinated polyalkyleneoxy chain having two chain ends, wherein one or both chain ends bear a carboxylic acid end group; a monofunctional carboxylic PFPE contains only one carboxylic acid end group and a bifunctional carboxylic PFPE contains two carboxylic acid end groups, one at each chain end;
the expression "non-functional PFPE" denotes a fluoropolymer containing a fully or partially fluorinated polyalkyleneoxy chain having two chain ends, wherein both chain ends bear a non-functional (or non-reactive) end group;
the prefix "(per)" in (per)fluoropolyether means that the polyoxyalkylene chain can be fully or partially fluorinated;
the acronym "PFPE" stands for a partially or fully fluorinated fluoropolyether as defined above;

the expression "high number average molecular weight (Mn) means" that the Mn of the (per)fluoropolyoxylakylene chain in the PFPE carboxylate is equal to or higher than 1,500.

"purifying (or "separating" or "enriching in") a mono- and/or bi-functional PFPE carboxylate from a starting mixture with non functional PFPEs means that the purification or separation or enrichment process leads to a mixture with higher average functionality of the starting mixture;

the expression "average functionality" refers to the average number of functional groups per polymer molecule in a PFPE mixture; average functionality can be determined, for instance, by $^{19}$F-NMR, as disclosed in the experimental section;

the expression "batch chromatography" means that the chromatography process is carried out discontinuously in a vessel, i.e. by carrying out different separation steps, each step comprising the separation of the solid support from the liquid phase;

the expression "solid support" (or "solid phase") denotes a compound containing sites or active groups able to provide polar bonds/interactions or hydrogen bonds with the end groups of the PFPEs in the mixture to be purified. For example, the solid support may contain hydroxy groups which, in the case of silica, are represented by silanol groups, or it is a solid compound able to generate positive electrostatic fields directed towards the outside of the solid phase surface, as in the case of alumina;

the expression "liquid phase" denotes the solvent or mixture of solvents used in each chromatography step;

values expressed as ranges include ranges end.

A mixture of non-functional and functional PFPEs carboxylates preferably complies with the following structure:

$$A\text{-}O\text{---}R_f\text{---}B \qquad (I)$$

in which:

A and B, equal to or different from one another, are functional groups of formula —CFXCOOH in which X is F or $CF_3$, or non functional straight or branched $C_1$-$C_4$ perfluoroalkyl groups wherein one fluorine atom can be substituted by one chlorine atom or one hydrogen atom; when chlorine is present in a non-functional group A or B, it is in a molar amount lower than 2% with respect to the overall amount of end groups;

Rf is a (per)fluoropolyoxylakylene chain having a number average molecular weight (Mn) higher than 1,500, preferably higher than 2,000, more preferably higher than 3,000 and lower than 15,000, preferably lower than 10,000, more preferably lower than 8,000, said chain containing repetitive units, which may be equal to or different from one another, selected from the following group: (CFYO), wherein Y is F or $CF_3$; ($CF_2CF_2O$); ($C_3F_6O$), including ($CF_2CF_2CF_2O$), ($CF_2CF(CF_3)O$) and ($CF(CF_3)CF_2O$); and ($CF_2CF_2CF_2CF_2O$); when the repetitive units are different from one another, they are statistically distributed along the chain.

Preferably, the mixtures of PPFEs which can be submitted to the process of the present invention contain an Rf chain selected from the following classes:

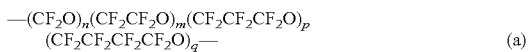

wherein m, n, p, q are 0 or integers selected in such a way as chain $R_f$ meets the above number average molecular weight requirement; when m is other than 0, the m/n ratio is preferably between 0.1 and 20; when (m+n) is other than 0, (p+q)/(m+n) is preferably between 0 and 0.2, extremes included;

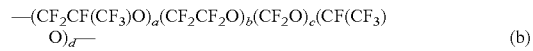

wherein a, b, c, d are 0 or integers selected in such a way as chain Rf meets the above number average molecular weight requirement; when b is other than 0, a/b is preferably between 0.1 and 10; when (a+b) is different from 0 (c+d)/(a+b) preferably is between 0.01 and 0.5, more preferably between 0.01 and 0.2;

wherein e, f, g are 0 or integers selected in such a way as chain Rf meets the above number average molecular weight requirement; when e is other than 0, (f+g)/is preferably between 0.01 and 0.5, more preferably between 0.01 and 0.2.

According to a first preferred embodiment of the invention, the mixture of formula (I) is a mixture wherein the amount of monofunctional PFPE carboxylic acid is higher than the amount of bifunctional PFPE carboxylic acid. In other words, according to this embodiment, the mixture of formula (I) is a mixture wherein the amount of PFPE carboxylic acid in which one of A and B is a —CFXCOOH group wherein X is as defined above and the other one is a non functional straight or branched $C_1$-$C_4$ perfluoroalkyl group as defined above (monofunctional PFPE carboxylic acid) is higher than the amount of PFPE carboxylic acid in which both A and B are a —CFXCOOH group wherein X is as defined above (bifunctional PFPE carboxylic acid). In this mixture, chain Rf is preferably a chain having structure (a) above, wherein n, m, p and q are selected in such a way as as Rf complies with a number average molecular weight higher than 1,500 or a chain having structure (c) above, wherein e, f and g are selected in such a way as Rf complies with a number average molecular weight higher than 2,000, even more preferably higher than 3,500.

According to a second preferred embodiment of the invention, the mixture of formula (I) is a mixture wherein the amount of bifunctional PFPE carboxylic acid is higher than the amount of monofunctional PFPE carboxylic acid. In other words, according to this embodiment, the mixture of formula (I) is a mixture wherein the amount of PFPE carboxylic acid in which both A and B are a —CFXCOOH group wherein X is as defined above (bifunctional PFPE carboxylic acid) is higher than the amount of PFPE carboxylic acid in which one of A and B is a —CFXCOOH group wherein X is as defined above and the other one is a non functional straight or branched $C_1$-$C_4$ perfluoroalkyl group as defined above (monofunctional PFPE carboxylic acid). In this mixture, chain Rf is preferably a chain having structure (a) or (b) above, in which preferably n, m, p and q or a, b, c and d are selected in such a way that Rf complies with a number average molecular weight higher than 1,500.

Mixtures of formula (I) can be manufactured according to several methods known in the art, starting for example from peroxidic PFPEs, obtained following the teaching of GB 1104482 (MONTEDISON SPA), U.S. Pat. No. 3,442,942 (MONTEDISON SPA), U.S. Pat. No. 5,777,291 (AUSIMONT SPA) or U.S. Pat. No. 5,258,110 (AUSIMONT SRL). Mixtures of formula (I) wherein the difunctional PFPE carboxylic acid prevails can be manufactured, for example, by oxy-polymerization of fluoroolefins as $C_2F_4$ and/or $C_3F_6$ with oxygen at low temperature in the presence UV light or a radical initiators, according to what described in the above-cited patents, and subsequent reduction, for example with hydrogen on a suitable catalyst containing palladium, as described, for example, in U.S. Pat. No. 6,127,498 (AUSIMONT SPA). Mixtures of formula (I) wherein the monofunctional PFPE carboxylic acid prevails can be obtained from the above peroxidic PFPEs after thermal of photochemical elimination of the peroxidic bonds or by partial fluorination of difunctional PFPE carboxylic acids or acyl fluorides, as taught, for example, in the aforementioned U.S. Pat. No. 8,008,523. Mixtures of formula (I) may also be prepared starting from non-functional PFPEs by treatment with Lewis acid catalysts, such as $AlF_3$, as taught, for example, in U.S. Pat. No. 4,755,330 (AUSIMONT SPA).

There is no limitation to the average functionality of the mixture of formula (I) to be submitted to the process the invention; typically, the mixture of formula (I) has an average functionality equal to or higher than 0.3.

A solid phase for carrying out the process of the invention is typically a polar inorganic solid support selected from silica gel, Al and Mg silicates and active alumina, typically in the neutral form, silica gel being preferred. Among the various types of silica gel, 70-230 mesh, 60 Å and 100 Å silica gel, and 230-400 mesh, 60 Å silica gel can be mentioned in particular, while among the various types of alumina, 150 mesh, 58 Å alumina can be mentioned in particular. Metal oxides, for example magnesium oxide, and $BaSO_4$ can also be mentioned as stationary phases.

Usually the solid support and mixture (M) are mixed in a weight ratio ranging from about 0.1 to 10, preferably of about 1:1.

The fluorinated organic solvent can be selected from trichlorotrifluoroethane; non-functional fully or partially fluorinated PFPEs having a boiling point lower than 200° C., preferably lower than 150° C., like Galden® HT PFPEs; perfluoroalkanes, for example perfluoroheptane; hydrofluorocarbons (HFCs); hydrofluoroethers and hydrofluoropolyethers (HFEs and HFPEs) and fully or partially fluorinated aromatic solvents, such as perfluorobenzene, trifluorotoluene and hexafluoroxylene isomers. According to a preferred embodiment of the invention, the solvent is selected from 1,3-bis(trifluoromethyl)benzene, Novec® HFE 7200 and Novec® HFE 7500. Typically, the fluorinated solvent in step a) is used in a weight ratio of 3:1 with respect to the amount of mixture (M).

Step a) is carried out by stirring the suspension for a time typically ranging from 15' to 3 hrs, preferably ranging from 1 to 2 hrs. A skilled person will be able to establish the duration of this step on the basis of the amount of mixture (M) and solid support and by sampling the liquid phase and evaluating the average functionality of mixture (M2) therein dissolved.

When the average functionality of mixture (M) is low, in order to remove as much non-functional PFPE as possible, rather than excessively prolonging the duration of step a), it is preferable to separate the liquid phase from the solid phase (step b) carry out one or more washings of the solid phase (step c). Washings are desirable when the average functionality of mixture (M) is particularly low, for instance as low as 0.3, and the desired functionality of mixture (M1) is equal to or higher than 0.9. Usually, two or three washings are sufficient; in any case, a skilled person will be able to determine the sufficient number of washings by sampling the liquid phase and measuring the average functionality of mixture (M2) therein dissolved.

The separation of the liquid phase from the solid phase can be carried out according to methods known in the art; typically, step b) is carried out by filtration on membranes that will be chosen according to the solid support used in step a).

In step d), the fluorinated organic solvent can be the same as or different from the one used in step a), provided that it is miscible with the selected alcohol; preferably, the solvent is the same as the one used in step a).

The alcohol is typically an alcohol of formula ROH, wherein R is a straight or branched, saturated or unsaturated alkyl radical with a number of carbon atoms ranging from 1 to 10, optionally substituted with an aryl radical, preferably a phenyl radical; or R is a $C_5$-$C_7$ cyclic radical, optionally partially fluorinated and optionally containing heteroatoms, for example oxygen; or R is an aryl radical, preferably a phenyl radical. Preferably, R is a straight or branched alkyl chain having from 1 to 4 carbon atoms; in a preferred embodiment of the invention, the alcohol is methanol or ethanol.

According to a most preferred embodiment, step a) is carried out with 1,3-bis(trifluoromethyl)benzene and step d) is carried out with methanol/1,3-bis(trifluoromethyl)benzene in a reciprocal weight amount of 3:7.

In step d), the alcohol and the fluorinated solvent are used in a reciprocal weight amount ranging from about 1:10 to about 4:1, preferably between 2:8 and 4:6, more preferably of 3:7. The weight ratio between the alcohol/fluorinated solvent liquid phase and the stationary phase (the weight of the stationary phase being that of the stationary phase initially added to the reaction vessel, i.e. without mixture (M) adsorbed on it) ranges from 2:1 to 10:1, preferably from 2:1 to 4:1.

Step d) is carried out at a temperature ranging from room temperature to 200° C. Preferably, step d) is carried out by heating suspension (S1); more preferably, step d) is carried out by heating suspension (S1) under ambient pressure at a temperature ranging from 50° C. to 100° C. for a time sufficient to remove mixture (M1) from the solid support. A skilled person will be able to determine the duration of step d) by sampling the liquid phase at regular intervals and determining the amount of mixture (M1) therein present.

Similarly to step b), step e) can be carried out according to methods known in the art and is typically carried out as indicated for step c).

The process of the invention is particularly convenient to be carried out on an industrial scale, because the polydispersity of the starting mixture (M) is not limiting, i.e. the process can successfully be accomplished also on mixtures (M) wherein the molecular weight delta between the PFPEs is high. The process of the invention can be carried out on mixtures (M) having a very low average functionality. For instance, starting from a mixture (M) of monofunctional PFPE carboxylate having an average functionality of 0.3 it is possible to obtain a mixture (M1) having an average functionality of at least 0.9. Furthermore, it has been observed that the recovered mixture (M1) usually contains a significant amount of carboxylic PFPE as ester with the alcohol used in step d); typically, the ester content is equal to or higher than 60% with respect to the weight of mixture (M1). For the sake of accuracy, mixtures (M1) can be represented by means of formula (I*) below:

$$A-O-Rf-B \qquad (I^*)$$

in which:
A and B, equal to or different from one another, are functional groups of formula —CFXCOOR' in which X is F or $CF_3$ and R' is H or R as defined above, or non functional straight or branched $C_1$-$C_4$ perfluoroalkyl groups wherein one fluorine atom can be substituted by one chlorine atom or one hydrogen atom; when chlorine is present in a non-functional group A or B, it is in a molar amount lower than 2% with respect to the overall amount of end groups; and Rf is as defined above.

Mixture (M1) can be either used as such or as precursor of further PFPE derivatives according to known methods; otherwise, mixture (M1) can be submitted to hydrolysis to give the desired carboxylic PFPE.

The invention is herein after illustrated in detail by means of the examples reported in the following experimental section.

Should the disclosure of any patents, patent applications, and publications which are incorporated herein by reference conflict with the description of the present application to the extent that it may render a term unclear, the present description shall take precedence.

EXPERIMENTAL SECTION

Material and Methods

Preparation 1 and Example 1 illustrating the process of the invention were carried out on a PFPE carboxylate mixture (M) prepared from a PFPE mixture of formula (II):

Z—O—PFPE-Y     (II)

wherein:
PFPE is a perfluoropolyoxyalkylene chain $(CF(CF_3)CF_2O)_e(CF_2O)_f(-CF(CF_3)O)_g$ (i.e. a chain Rf of class (c) above), in which e/(f+g) is 12. Z and Y are the same or different from one another and are selected from $CF_3$, $(CF_3)_2CFCF_2$, $CF_2COOH$, $CF(CF_3)COOH$, $CF_2C(O)CF_3$ (average molecular weight of 5,359 g/mol; average functionality 0.8)

PFPE mixture (II) was prepared starting from a PFPE peroxide obtained according to U.S. Pat. No. 3,442,942, followed by thermal treatment up to 200° C. in order to eliminate the peroxidic units and final hydrolysis to convert the acyl fluoride end groups into carboxylic acid end groups.

The end group distribution of mixture (II), determined by $^{19}$F-NMR, is reported in Table 1 below.

1,3-bis trifluoromethyl benzene and methanol were respectively available from Miteni® and Aldrich® and were used without further purification.

Silica gel grade 9385 was purchased from Merck.

$^1$H-NMR and $^{19}$F-NMR were recorded on a Agilent System 500 operating at 499.86 MHz for $^1$H and 470.30 MHz for $^{19}$F.

Determination of the Average Functionality

The average functionality (F), defined by the following equation:

average functionality=$2*E_f/(E_f+E_n)$ wherein $E_f$ is the number of functional end groups and $E_n$ is the number of non functional end groups
was determined by means of $^1$H-NMR and $^{19}$F-NMR according to known methods, for example as disclosed in U.S. Pat. No. 5,919,614 with suitable modifications.

Preparation 1

Mixture (M) of Non Functional, Mono- and Bi-Functional PFPE Carboxylate from PFPE (II)

A 3-necked round bottom flask with 3 L capacity, equipped with condenser, additional funnel and mechanical stirrer, was charged with 2 kg of 1,3-bis(trifluoromethyl)benzene and 1 kg of PFPE (II) with average molecular weight of 5,359 g/mol and average functionality (F) of 0.8. The resulting solution was added with 40 g of KOH, (50% w/w water solution), the temperature was raised up to 65° C. and the reaction mixture was let under stirring for 4 hrs.

The temperature was cooled down to room temperature, 50 g of HCl (25% w/w water solution) were slowly added, the temperature was raised up to 65° C. and the reaction mixture was left under stirring for further 2 hrs.

After this time, the temperature was cooled down to room temperature, the reaction mixture was transferred into a separatory funnel and the lower phase was evaporated, initially at room pressure and then under vacuum (down to a pressure of $9 \times 10^{-2}$ mm Hg at a temperature of 110° C.).

The isolated residue (989 g), herein after referred to as mixture (M), was characterized by means of $^1$H-NMR and $^{19}$F-NMR and turned out to have an average molecular weight of 5,595 g/mol, a functionality (F) of 0.35 and no keto end groups. Table 1 below summarizes the end group distribution of mixture (M).

TABLE 1

| End group | PFPE (II) | Mixture (M) |
|---|---|---|
| —OCF$_2$COOH | 6.6 | 11.8 |
| —OCF(CF$_3$)COOH | 5.9 | 5.5 |
| —OCF$_2$C(O)CF$_3$ | 27.7 | 0 |
| —OCF$_3$ | 58.8 | 61.5 |
| (CF$_3$)$_2$CFCF$_2$O— | 1 | 0.5 |
| —OCF$_2$H | 0 | 20.7 |

Example 1

According to the Invention—Purification of Mixture (M)

A 3-necked round bottom flask with 3 L capacity, equipped with a condenser and mechanical stirrer, was charged with 0.5 kg of silica gel (Merk grade 9385), 1.6 kg of 1,3-bis(trifluoromethyl)benzene and 0.5 kg of Product A. The resulting suspension was kept under stirring at room temperature for two hours and then filtered by means of a pressure filter equipped with a 0.2 μm PTFE membrane.

The silica gel was charged again into the reactor, added with 1.6 kg of 1,3-bis(trifluoromethyl)benzene, kept under stirring at room temperature for 1.5 hrs and filtered. This procedure was repeated one more time, then the silica gel was charged again into the reactor, added with 1.2 kg of a 30/70 mixture (w/w) of MeOH/1,3-bis(trifluoromethyl)benzene and let under stirring at reflux for 7 hrs.

The suspension was then cooled down to room temperature, filtered and the organic phase was evaporated, initially at room pressure and then under vacuum (down to a pressure of $9 \times 10^{-2}$ mm Hg and a temperature of 110° C.).

The isolated residue (0.15 kg) was characterized by means of $^1$H-NMR and $^{19}$F-NMR and turned out to be a mixture (M1) substantially containing a monofunctional PFPE-methyl ester, with average functionality (F) of 0.95, Mn=5,805 g/mol and the end group distribution reported in Table 2 below.

The yield of the isolated fraction is 30% (w/w) with respect to the starting material and corresponds to more than 70% recovery of the functional groups.

TABLE 2

| End group | Mixture (M1) |
|---|---|
| —OCF$_2$COOCH$_3$ | 39.2 |
| —OCF(CF$_3$)COOCH$_3$ | 8.5 |
| —OCF$_2$C(O)CF$_3$ | 0 |
| —OCF$_3$ | 43.9 |
| (CF$_3$)$_2$CFCF$_2$O— | 0.6 |
| —OCF$_2$H | 7.8 |

Comparative Example

The example according to the invention was repeated with the difference that 1.2 kg methanol instead of a 1.2 kg of a 30/70 mixture (w/w) of MeOH/1,3-bis(trifluoromethyl)benzene was used in the last step of the process. After evaporation of the methanolic suspension, no PFPE product was recovered.

Preparation 2

Preparation of Mixture (M') of Non Functional, Mono- and Bi-Functional PFPE Carboxylate A PFPE carboxylate mixture (M') having formula:

A-O—Rf—B wherein:
R$_f$ represents a perfluoropolyoxyalkylene chain (CF$_2$CF$_2$O)$_m$(CF$_2$O)$_n$, in which m/n is 1.2, and containing also small amounts of units —CF$_2$CF$_2$CF$_2$O— and —CF$_2$CF$_2$CF$_2$CF$_2$O—(i.e. a chain Rf of class (a) above)
A and B are the same or different from one another and are selected from —CF$_3$, —CF$_2$H, and —CF$_2$COOH
having an average molecular weight of 3,660 g/mol and average functionality (F) of 1.93
was prepared starting from a PFPE peroxide obtained according to U.S. Pat. No. 5,777,291, followed by catalytic hydrogenation according to U.S. Pat. No. 6,127,498, esterification with ethanol, elimination of the lower MW fractions by distillation and hydrolysis.

Example 2

According to the Invention—Purification of Mixture (M')

A 3-necked round bottom flask with 0.5 L capacity, equipped with condenser and mechanical stirrer, was charged with 0.125 kg of silica gel (Merk grade 9385), 0.4 kg of 1,3-bis(trifluoromethyl)benzene and 0.125 kg of mixture (M'). The resulting suspension was kept under stirring at room temperature for two hours and then filtered by means of a pressure filter equipped with a 0.2 μm PTFE membrane.

The silica gel was charged again into the reactor, added with 0.25 kg of a 30/70 mixture (w/w) of MeOH/1,3-bis(trifluoromethyl)benzene and kept under stirring at reflux for 7 hrs; the suspension was then cooled down to room temperature and filtered and the organic phase recovered. The procedure was repeated one more time. The recovered organic phases were pooled and evaporated, initially at room pressure and then under vacuum (down to a pressure of 9×10$^{-2}$ mm Hg and at a temperature of 110° C.).

The isolated residue (0.112 kg), i.e. mixture (M'-1), was analysed by means of $^1$H-NMR and $^{19}$F-NMR: it turned out to be a mixture represented by formula (I*) as defined above, in which A and B, equal to or different from one another, are groups independently selected from —CF$_3$, —CF$_2$H and —CF$_2$COOCH$_3$, and Rf is as defined above, having average molecular weight of 3,487 g/mol and average functionality (F) increased up to 1.96.

Preparation 3

Preparation of Mixture (M") of Non Functional, Mono- and Bi-Functional PFPE Carboxylate A PFPE carboxylate mixture of formula:

Z—O—PFPE-Y  (II')

wherein:
PFPE is a perfluoropolyoxyalkylene chain (CF$_2$CF$_2$O)$_m$(CF$_2$O)$_n$, the ratio m/n is equal to 1.2, and containing also small amounts of units —CF$_2$CF$_2$ CF$_2$O— and —CF$_2$CF$_2$CF$_2$CF$_2$O— (i.e. a chain Rf of class (a) above); Z and Y are independently selected from —CF$_3$, —CF$_2$H and CF$_2$COOH, with an average molecular weight of 3,660 g/mol and average functionality (F) of 1.94 was submitted to fluorination with elemental fluorine until obtaining a mixture (M") having F=0.30. During the fluorination treatment a fraction of the —CF$_2$COOH groups was transformed into —CF$_3$ groups and the —CF$_2$H groups were also converted into —CF$_3$ groups.

Example 3

According to the Invention—Purification of Mixture (M")

A 3-necked round bottom flask with 1 L capacity, equipped with a condenser and mechanical stirrer, was charged with 0.25 kg of silica gel (Merk grade 9385), 0.750 kg of 1,3-bis(trifluoromethyl)benzene and 0.5 kg of mixture (M"). The resulting suspension was kept under stirring at room temperature for two hours and then filtered by means of a pressure filter equipped with a 0.2 μm PTFE membrane.

The silica gel was charged again into the reactor, added with 0.750 kg of 1,3-bis(trifluoromethyl)benzene, kept under stirring at room temperature for 1.5 hrs and filtered. This procedure was repeated two more times, then the silica gel was charged again into the reactor, added with 0.750 kg of a 30/70 mixture (w/w) of MeOH/1,3-bis(trifluoromethyl)benzene and let under stirring at reflux for 7 hrs; the suspension was then cooled down to room temperature and filtered. The procedure was repeated two more times.

Eventually, all the obtained organic phases were pooled and evaporated, initially at room pressure and then under vacuum (down to a pressure of 9×10$^{-2}$ mm Hg and a temperature of 110° C.).

The isolated residue (0.076 kg), mixture (M"-1) was analysed by means of $^1$H-NMR and $^{19}$F-NMR and turned out to be a mixture represented by formula (I*) as defined above, in which A and B, equal to or different from one another, are groups selected from —CF$_3$ and —CF$_2$COOCH$_3$ having average molecular weight Mn=3,470 g/mol and average functionality F=1.12.

The yield of the isolated fraction is 15% (w/w) with respect to the starting material and corresponds to 55% recovery of the functional groups.

The invention claimed is:
1. A batch chromatography process for the purification of (per)fluoropolyethers (PFPE) carboxylates, the process comprising:

a) contacting a mixture (M) of non-functional PFPEs and functional PFPEs carboxylates wherein Mn of the (per)fluoropolyoxylakylene chain in the PFPE carboxylate is equal to or higher than 1,500, said mixture (M) having functionality (F), with a solid phase and a fluorinated organic solvent at ambient conditions to obtain a suspension (S) of a solid phase having adsorbed onto it a mixture (M1) of functional PFPE carboxylates with functionality (F1) higher than (F) and a liquid phase having therein dissolved a mixture (M2) with functionality (F2) lower than (F);

b) separating the liquid phase from the solid phase;

c) optionally carrying out one or more washings of the solid phase with the same fluorinated solvent as used in step a);

d) adding the solid phase with a mixture of an alcohol and a fluorinated organic solvent to obtain a suspension (S2) of the solid phase in a liquid phase, said liquid phase having mixture (M1) therein dissolved;

e) separating the liquid phase from the stationary phase.

2. The process according to claim 1, wherein the (per)fluoropolyether mixture (M) complies with formula (I) below:

$$A\text{-}O\text{—}R_f\text{—}B \qquad (I)$$

wherein:
A and B, equal to or different from one another, are functional groups of formula —CFXCOOH in which X is F or $CF_3$, or non-functional straight or branched $C_1$-$C_4$ perfluoroalkyl groups wherein one fluorine atom can be substituted by one chlorine atom or one hydrogen atom; provided that, when chlorine is present in a non-functional group A or B, it is in a molar amount lower than 2% with respect of the non-functional group;

$R_f$ is a (per)fluoropolyoxylakylene chain having a number average molecular weight higher than 1,500 and lower than 15,000, said chain containing repetitive units, which may be equal to or different from one another, selected from the group consisting of: (CFYO), wherein Y is F or $CF_3$; ($CF_2CF_2O$); ($C_3F_6O$); ($CF_2CF_2CF_2O$); ($CF_2CF(CF_3)$); ($CF(CF_3)CF_2O$); and ($CF_2CF_2CF_2CF_2O$); when the repetitive units are different from one another, they are statistically distributed along the chain.

3. The process according to claim 2, wherein $R_f$ is selected from the following classes:

$$\text{—}(CF_2O)_n(CF_2CF_2O)_m(CF_2CF_2CF_2O)_p(CF_2CF_2CF_2CF_2O)q\text{-} \qquad (a)$$

wherein m, n, p, q are 0 or integers selected such that $R_f$ has a Mn equal to or higher than 1,500;

$$\text{—}(CF_2CF(CF_3)O)_a(CF_2CF_2O)_b(CF_2O)_c(CF(CF_3)O)_d\text{—} \qquad (b)$$

wherein a, b, c, d are 0 or integers selected such that $R_f$ has a Mn equal to or higher than 1,500; and $$\text{—}(CF_2CF(CF_3)O)_e(CF_2O)_f(CF(CF_3)O)_g\text{—} \qquad (c)$$

wherein e, f, g are 0 or integers selected such that $R_f$ has a Mn equal to or higher than 1,500.

4. The process according to claim 2, wherein the mixture of formula (I) is a mixture wherein the amount of PFPE carboxylic acid in which one of A and B is the —CFXCOOH group and the other one is the non-functional straight or branched $C_1$-$C_4$ perfluoroalkyl group, and wherein the amount of PFPE carboxylic acid is higher than the amount of PFPE carboxylic acid wherein both A and B are a —CFXCOOH group.

5. The process according to claim 4, wherein chain $R_f$ belongs to class (a) or (c):

$$\text{—}(CF_2O)_n(CF_2CF_2O)_m(CF_2CF_2CF_2O)_p(CF_2CF_2CF_2CF_2O)q\text{-} \qquad (a)$$

wherein m, n, p, q are 0 or integers selected such that $R_f$ has a Mn equal to or higher than 1,500; or $$\text{—}(CF_2CF(CF_3)O)_e(CF_2O)_f(CF(CF_3)O)_g\text{—} \qquad (c)$$

wherein e, f, g are 0 or integers selected such that $R_f$ has a Mn equal to or higher than 1,500.

6. The process according to claim 2, wherein the mixture of formula (I) is a mixture wherein the amount of PFPE carboxylic acid in which both A and B are the —CFXCOOH group is higher than the amount of PFPE carboxylic acid in which one of A and B is the —CFXCOOH group the other one is the non-functional straight or branched $C_1$-$C_4$ perfluoroalkyl group.

7. The process according to claim 6, wherein chain $R_f$ belongs to class (a) or (b):

$$\text{—}(CF_2O)_n(CF_2CF_2O)_m(CF_2CF_2CF_2O)_p(CF_2CF_2CF_2CF_2O)q\text{-} \qquad (a)$$

wherein m, n, p, q are 0 or integers selected such that $R_f$ has a Mn equal to or higher than 1,500;

$$\text{—}(CF_2CF(CF_3)O)_a(CF_2CF_2O)_b(CF_2O)_c(CF(CF_3)O)_d\text{—} \qquad (b)$$

wherein a, b, c, d are 0 or integers selected such that $R_f$ has a Mn equal to or higher than 1,500.

8. The process according to claim 1, wherein the fluorinated organic solvent is selected from trichlorotrifluoroethene; non-functional fully or partially fluorinated PFPEs; perfluoroalkanes; hydrofluorocarbons (HFCs); hydrofluoroethers; hydrofluoropolyethers and fully or partially fluorinated aromatic solvents.

9. The process according to claim 8, wherein the fluorinated solvent is selected from 1,3-bis(trifluoromethyl)benzene, mixtures of ethyl nonafluoroisobutyl ether and ethyl nonafluoro-n-butyl ether, and 3-ethoxy-1,1,1,2,3,4,4,5,5,6,6,6-dodecafluoro-2-trifluoromethyl-hexane.

10. The process according to claim 1, wherein the alcohol is selected from methanol and ethanol.

11. The process according to claim 10, wherein the alcohol is methanol.

12. The process according to claim 1, wherein the solid phase is selected from silica gel, Al and Mg silicates and active alumina.

13. The process according to claim 12, wherein the solid phase is silica gel.

14. The process according to claim 1, wherein step d) comprises adding the solid phase with a mixture of an alcohol and a fluorinated organic solvent to obtain a suspension (S1) and heating to obtain a suspension (S2) of the solid phase in a liquid phase, said liquid phase having mixture (M1) therein dissolved.

15. The process according to claim 3, wherein m/n is between 0.1 and 20, extremes included, when m is other than 0; and wherein (p+q)/(m+n) is between 0 and 0.2, extremes included, when (m+n) is other than 0.

16. The process according to claim 3, wherein a/b is between 0.1 and 10 when b is other than 0; and wherein (c+d)/(a+b) is between 0.01 and 0.5 when (a+b) is other than 0.

17. The process according to claim 3, wherein (f+g)/e is between 0.01 and 0.5 when e is other than 0.

* * * * *